United States Patent [19]
Arroyo et al.

[11] Patent Number: 5,913,003
[45] Date of Patent: Jun. 15, 1999

[54] COMPOSITE FIBER OPTIC DISTRIBUTION CABLE

[75] Inventors: Candido John Arroyo, Lithonia; David Shepherd Hancock, Roswell, both of Ga.; Fons van den Heuvel, Hilversum; William J. Shinnick, Eemnes, both of Netherlands

[73] Assignee: Lucent Technologies Inc., Murray Hill, N.J.

[21] Appl. No.: 08/781,338

[22] Filed: Jan. 10, 1997

[51] Int. Cl.⁶ .................................................. G02B 6/44
[52] U.S. Cl. ........................ 385/101; 385/106; 385/103; 385/107; 385/113
[58] Field of Search ....................... 385/100–114

[56] References Cited

U.S. PATENT DOCUMENTS

| | | | |
|---|---|---|---|
| 4,375,313 | 3/1983 | Anderson et al. | 350/96.23 |
| 4,484,963 | 11/1984 | Anctil et al. | 385/107 |
| 4,557,560 | 12/1985 | Bohannon, Jr. et al. | 385/107 |
| 4,781,433 | 11/1988 | Arroyo et al. | 350/96.23 |
| 4,844,574 | 7/1989 | Chande | 350/96.18 |
| 4,909,592 | 3/1990 | Arroyo et al. | 350/96.23 |
| 4,913,517 | 4/1990 | Arroyo et al. | 385/107 |
| 5,189,718 | 2/1993 | Barrett et al. | 385/101 |
| 5,268,971 | 12/1993 | Nilsson et al. | 385/101 |
| 5,621,841 | 4/1997 | Field | 385/113 |

FOREIGN PATENT DOCUMENTS

| | | |
|---|---|---|
| 0351100 | 1/1990 | European Pat. Off. . |
| 2679045 | 1/1993 | France . |
| 3908903A1 | 9/1990 | Germany . |

*Primary Examiner*—Hung N. Ngo

[57] ABSTRACT

A fiber optic distribution cable including, in one aspect, a core tube with at least one optical fiber, at least one electric power conducting member extending alongside the core, a contiguous layer formed of a plurality of strength members, and a plastic jacket. In another aspect, the cable includes a core of at least one optical fiber member and at least one electrical power conducting member encased in a strength member contiguous layer and a plastic outer jacket. Both embodiments include water locking means.

11 Claims, 2 Drawing Sheets

COMPOSITE FIBER OPTIC DISTRIBUTION CABLE

FIELD OF THE INVENTION

This invention relates to a communications cable offering both fiber optic and electrical power capacity. More particularly, it relates to a communications cable designed to supply both an optical signal and an electrical power signal.

BACKGROUND OF THE INVENTION

Optical fibers and optical fiber cables have become the preferred telecommunications transmission medium used in the United States and in the world. Fiber optic cables have revolutionized the long distance telecommunications industry and are also penetrating into local telephone markets and CATV (cable television) markets, displacing older technologies. Optical transmission offers numerous advantages over prior technology. For example, a fiber optic cable may provide a transmission distance of fifty miles or more with currently available electronics, may transport digital light pulses for essentially noise free communications and transmissions of vast quantities of information. The fibers, when used to transmit information in a digital signal form, are useful over wide signal bandwidths, and can replace both coaxial cables currently used for broadband signals and copper pair cables currently used for narrowband voice signals. Fiber optic cables are thus taking the place of conventional cables due to their high bit rate capacity, small size, and light weight. However, most home and office electronic devices are not adapted to receive optical signals. Thus, in general, the optical signal must be converted to an electrical signal before it is supplied to the end user.

In many cases, fiber optic cable is supplied to an optical network unit (ONU). At that point, the optical signal is converted into an electrical signal, after which it is transmitted to the end user. If the electrical signal is being provided to a multi-story, multi-user building, the ONU may be located in, for example, the basement of the building. Otherwise, the ONU may be located at a central, off site, location from which multiple lines are run to multiple users.

The conversion of an optical signal to an electrical signal requires electricity, which is most commonly obtained from tapping off the neighborhood or household electrical power lines. However, this has a disadvantage in that localized power outages will also cause disruption of the electrical communications signal. In addition, the cost of converting the optical signal to an electrical signal cannot be adequately charged to each end user due to fluctuations in usage rates.

One solution to the above problem is disclosed in U.S. Pat. No. 5,268,971 issued to Nilsson et al. This patent discloses a composite cable having a bundle of optical fibers and a plurality of insulated metallic conductors all wrapped within an aluminum shield. The shield is covered by steel armor. This cable is inadequate for the purposes described above because it is extremely awkward to handle. The aluminum shield and steel armor render the cable unmanageable and the power conductors and optical fibers are inaccessible to a worker making splices and/or working on the cable.

Another composite cable is disclosed in U.S. Pat. No. 4,375,313 issued to Anderson et al. The cable disclosed therein has a central cushioning core about which are helically wrapped one or more optical fibers. A further cushioning blanket is wrapped about the optical fibers. The blanket is wrapped by a tape jacket preferably formed of metal. A plurality of strength members form a jacket about the optical fiber core and one or more electrical conductors can be located between the jacket and the core. A disadvantage of this cable is the requirement of wrapping and unwrapping the metallic jacket in order to gain access to the transmission media.

Another composite cable having both optical fibers and electrical conductors is taught by Barrett et al. in U.S. Pat. No. 5,189,718. In this cable, the electrical conductors are contained in one tube and the optical fibers are contained in a second tube. The first and second tubes are connected by a web. This cable has the disadvantage that splicing both cables in one closure is awkward and difficult.

Apparently, the prior art is devoid of a cable which provides both metallic and optical fiber conductors in a simple, easy to splice arrangement. The ideal cable should have sufficient strength to function as a distribution cable, but should not be too heavy or unmanageable for use within a building. In addition, the deal cable should be easily manipulatable by a worker so that he or she can easily cut the cable and splice the electrical conductors and optical fibers as needed. The ideal (able should have appropriate waterblocking features to prevent the ingress of water and should have appropriate strength features to protect the optical fibers.

SUMMARY OF THE INVENTION

The present invention is directed to, and represents, a solution to the various problems and deficiencies of prior art cable systems as discussed in the foregoing.

The cable of this invention includes a longitudinally extending central core tube encasing one or more optical fibers and at least one electrical power conducting member extending longitudinally along the side of the core tube. The cable further includes a plurality of longitudinally extending non-metallic strength members such as aramid or glass yarns arranged about the core tube so as to form a strength-providing jacket about the core tube and an outer, plastic jacket encasing the plurality of strength members. In a preferred embodiment, a twisted pair of electrical power conductors extend longitudinally along the core tube and the plurality of non-metallic strength members are wrapped helically about the core tube and over the twisted pair. Where the cable is designed to be used inside a building, the outer jacket includes a flame retardant system. If extra strength is needed, a double layer of non-metallic strength members can be used, with the layers helically wrapped in opposite directions.

In another embodiment, the present invention is a composite fiber optic distribution cable that includes a core, containing at least one optical fiber member and at least one electrical power conducting member arranged about a centrally disposed longitudinally extending strength member. A plastic jacket encloses the core and a plurality of fibrous strength members are disposed between the core and the jacket. The fibrous strength members are provided with means for preventing the flow of water within the cable. In a preferred embodiment, the optical fiber members include an optical fiber wrapped with at Least one layer of a coating material, a layer of fibrous strength members, and a plastic jacket. The jacket may include flame retardant means.

The cable of the invention is particularly designed for use between the remote terminal (RT) and the ONU. The cable can be used outside or inside of a building, with flame retardant means added to the plastic jacket if the cable is used inside a building. The cable can be easily spliced and easily manipulated through the plenum space of a building, for example.

The numerous features and advantages of the present invention will be readily apparent from the following detailed description read in conjunction with the accompanying drawings.

DETAILED DESCRIPTION OF THE PREFERRED EMBODIMENT

Figure 1:
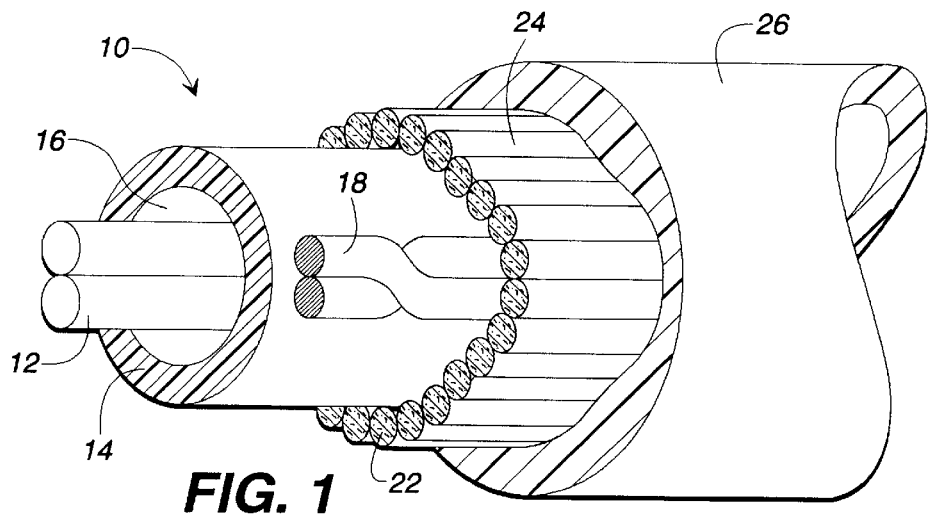
FIG. 1 is a perspective, partially cutaway view of one preferred embodiment of the composite cable of the invention.
Figure 2:
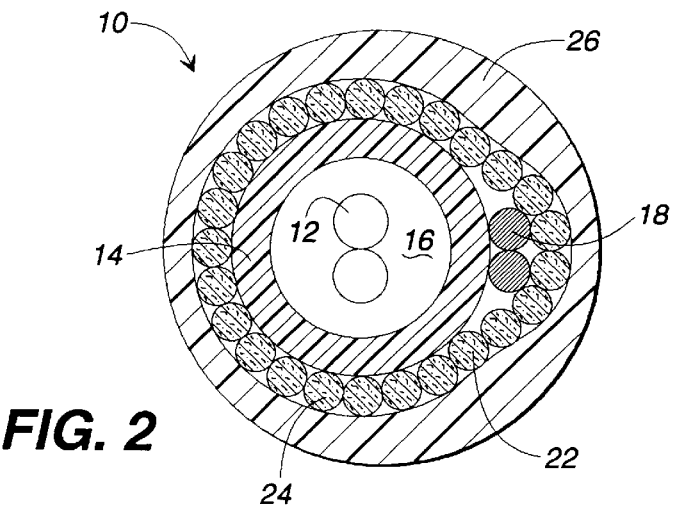
FIG. 2 is a cross sectional view of the cable of FIG. 1.

In FIG. 1 there is shown in perspective a composite cable 10 of the present invention. The cable includes one or more unbuffered optical fibers 12 disposed within a core tube 14. A waterblocking member or means is disposed within core tube 14. In the embodiment shown, the waterblocking means 16 is a gel such as taught in U.S. Pat. No. 4,844,575, issued to Kinard et al. on Jul. 4, 1989. Alternatively, the waterblocking member may be a super absorbent yarn or a waterblocking tape such as taught in U.S. Pat. No. 4,909,592 issued to Arroyo et al. on Mar. 20, 1990, the disclosure of which is incorporated herein in its entirety by reference. The yarn may be yarn which has been treated with a water swellable (superabsorbent) material or yarn made from water swellable fiber. Yarn suitable for such use is manufactured by Japan Exlan Company Ltd. of Osaka, Japan under the trade designation LANSEAL-F™ Other water blocking means and variations of the ones specifically disclosed herein can also be used to advantage in the invention.

At least one electrical power conducting member extends longitudinally alongside core tube 14. In the embodiment shown in FIG. 1, a twisted pair of insulated conductors 18 of, for example, 22 gauge copper, runs longitudinally along the core tube 14. The conductors could be arranged in another manner. For example, the conductors could be wrapped helically about the core tube. If desired, another pair of conductors could extend along the core tube, on the opposite side of the core tube from twisted pair 18.

A plurality of non-metallic strength members 22 are arrayed about core tube 14 in close engagement with each other so as to form a contiguous layer 24 around the core tube 14. These strength members can extend along the longitudinal axis of the core tube as shown in FIG. 1 or may be helically wrapped about the core tube. Strength members 22 can be made of an aramid such as poly(p-phenyleneterephthalamide) sold under the trade name KEVLAR® or may be made out of fiberglass. The strength members may function also as waterblocking members. For example, the strength members could be impregnated with a water swellable superabsorbent material.

The non-metallic strength members may be a combination of strength providing filaments and waterblocking filaments. For example, the strength members could have a percentage of filaments of KEVLAR® and a percentage of filaments of waterblocking filaments such as LANSEAL-F™ fiber.

The contiguous layer 24 formed of strength members 22 is covered with a plastic outer jacket 26. The outer jacket may have flame retardant and/or smoke resistant properties as required. For example, if the ONU is located in the basement of a multi-unit building, the present cable may be used inside the building in which case it must satisfy government-imposed flame retardant characteristics for such cables. For outside use, the jacket composition can be polyethylene or polyurethane. For flame retardant purposes, the material may be polyvinylchloride with additional flame retardant and smoke retardant additives or KYNAR™, a trademark of Elf Atochem North America for synthetic fluoropolymer resins. For example, a suitable jacket material is disclosed by Arroyo et al. in U.S. Pat. No. 4,781,433, the disclosure of which is incorporated herein in its entirety, by reference.

In addition, the cable may include additional waterblocking members such as waterblocking yarns and/or waterblocking tape under the outer jacket 26.

If additional strength is desired for the cable, a second layer of strength members can be employed. The second strength layer would preferably be wound in a helical fashion around the core tube in an opposite direction from the first layer 24.

Figure 3:
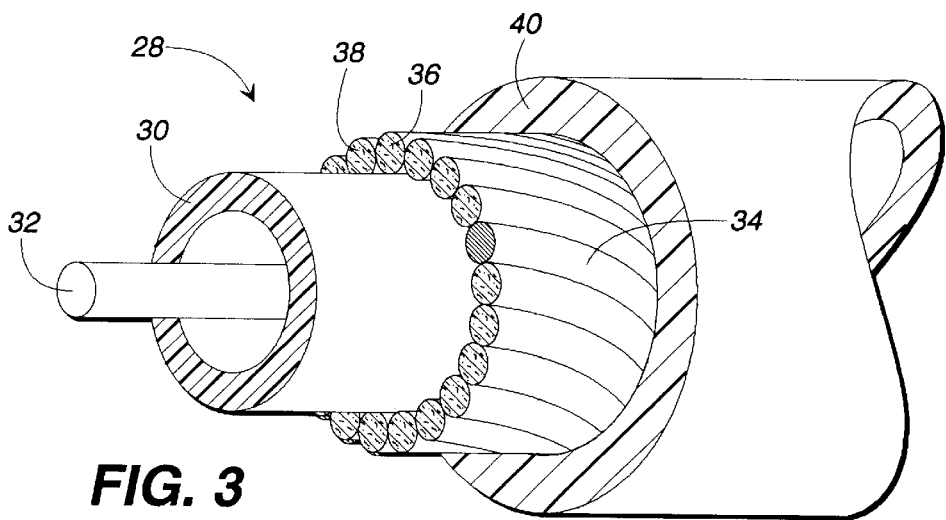
FIG. 3 is a perspective, partial cutaway view of a second preferred embodiment of the composite cable of the invention.
Figure 4:
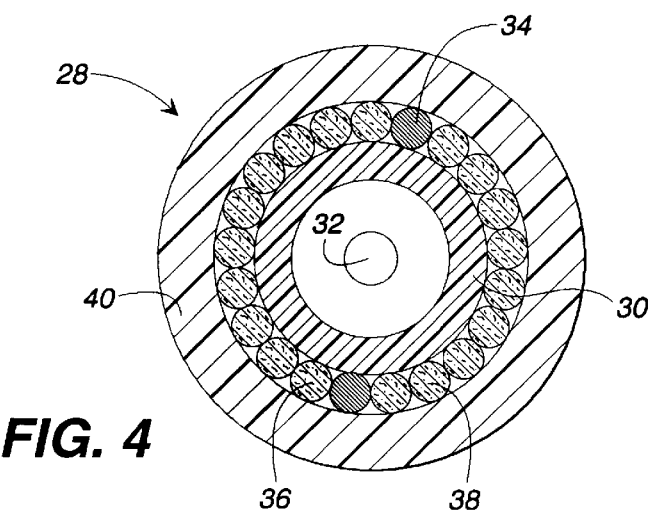
FIG. 4 is a cross sectional view of the composite cable of FIG. 3.

A second preferred embodiment of the invention is illustrated in FIGS. 3 and 4. In this embodiment, the cable is illustrated generally by 28 and includes a core tube 30, that encloses one or more optical fibers 32 (only one is shown in the figure). The core tube may contain waterproofing means or members such as described above. A pair of 22 gauge copper conductors 34 are helically wrapped about core tube 30, one on each side of the core tube 30.

A plurality of strength members 36 surround the core tube 30 in close proximity with each other so as to form a contiguous layer 38 about the core tube. In the preferred embodiment the strength members are helically wrapped about the core and the conductors 34 form two elements in the contiguous strength jacket 38. The strength members can be the same type as those above described for the first embodiment.

An outer jacket 40 surrounds the layer of strength members. The outer jacket 40 is preferably a thermoplastic such as described above in relation to the first embodiment.

The above-described cable can be easily accessed by a skilled worker and both the optical fibers and/or the conductors can be easily spliced. The cable is designed specifically for use as a distribution medium between the RT and the ONU. Use of the cable means that power does not have to be separately supplied to the ONU, and thus the ONU is not susceptible to extrinsic power losses.

Figure 5:
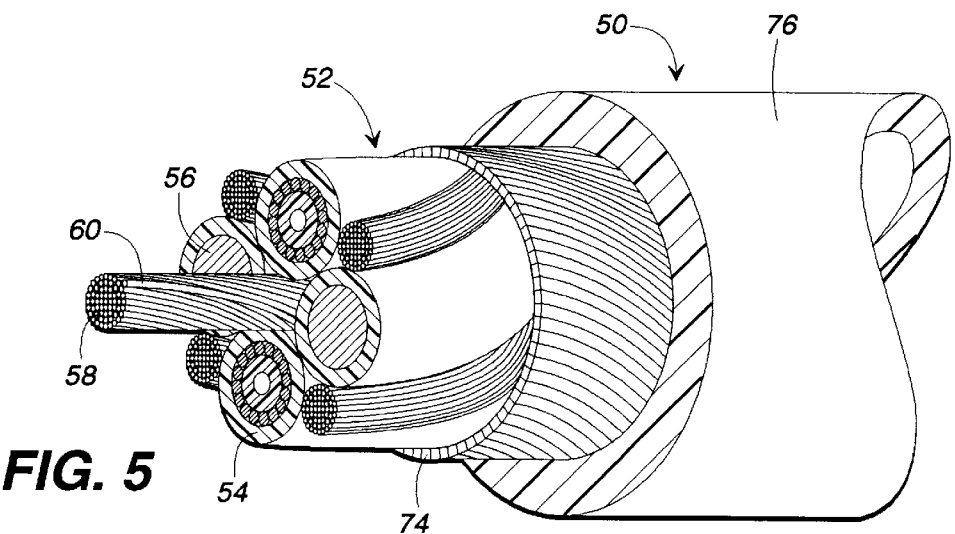
FIG. 5 is a perspective, partial cutaway view of a third preferred embodiment of the composite cable of the invention.
Figure 6:
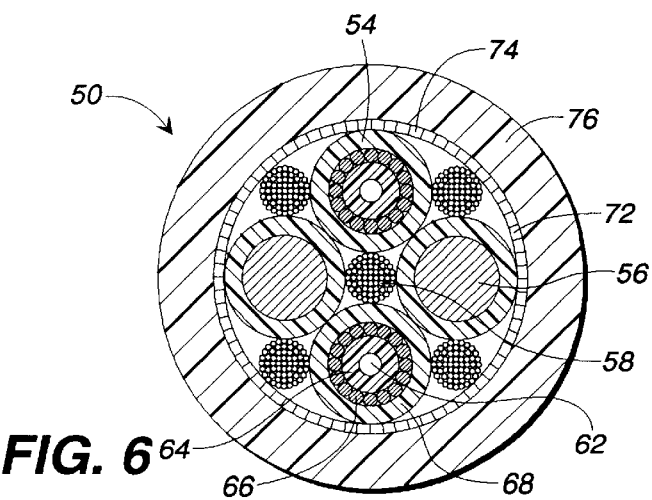
FIG. 6 is a cross sectional view of the composite cable of FIG. 5.

A third embodiment of a composite fiber optic distribution cable in accordance with the invention is shown in FIGS. 5 and 6. This embodiment is designed specifically for use inside buildings and for access by workers inside the buildings who are not used to handling optical fibers. The large optical fiber members are more easily manipulated than the individual optical fibers of the above-described embodiments. The cable is illustrated generally by 50 and includes a core 52. One or more optical fiber members 54 are disposed within the core 52, along with one or more insulated electrical conductors 56. The optical fiber members 54 and insulated conductors 56 are arrayed about a central member 58, which comprises a waterblocking material in the form of a plurality of waterblocking yarns, for example. Preferably, the optical fiber members and insulated conductors are helically twisted around the central member in the opposite direction of the binder.

The optical fiber members, shown more clearly in FIG. 6, comprise at least one optical fiber 62 enclosed in a single layer or dual layers of coating material 64. A strength member system encloses the coating material and a plastic jacket 68 encloses the strength member system. Typically, the strength member system is comprised of a plurality of strength members 66, each comprising a fibrous material which has been impregnated with a super absorbent material. For example, the strength member may be made of KEVLAR® filaments treated with a water soluble liquid absorbent material or intermixed with LANSEAL-F™ filaments. Such yarns are known in the art. A plurality of waterblocking members may be included in the core and may serve both a waterblocking function and organizing function.

The core is enclosed by sheath system 72, which includes a waterblocking strength member system 74 and an outer plastic jacket 76. The waterblocking strength member system preferably comprises a plurality of helically wrapped waterblocking yarns such as those described above. For example, the yarns can include KEVLAR® filaments mixed with LANSEAL-F™ filaments so that the yarns provide both a strength providing function and waterblocking function.

The plastic jacket 76 is preferably flame resistant and smoke retardant and may be made of PVC, for example, with appropriate additives, KYNAR™, or polyethylene for outside plant applications.

It is to be understood that the above-described arrangements are simply illustrative of the invention. Other arrangements may be devised by those skilled in the art, which will embody the principles of the invention and fall within the spirit and scope thereof.

What is claimed is:

1. A composite fiber optic distribution cable having a longitudinal axis, comprising:
    a longitudinally extending central core tube encasing at least one longitudinally extending optical fiber;
    at least one first electrical power conducting member extending alongside said core tube;
    a plurality of non-metallic strength members arrayed about said core tube, said strength members being wrapped helically about said core tube; and
    an outer jacket encasing said plurality of strength members.

2. The composite cable of claim 1, further comprising at least one waterblocking means within said core tube.

3. The composite cable of claim 2, wherein said waterblocking means is a gel, a waterblocking yarn, or a waterblocking tape.

4. The composite cable of claim 1, further comprising at least one second electrical power conducting member extending alongside said core tube, on the opposite side of the cable longitudinal axis from said at least one first electrical power conducting member.

5. The composite cable of claim 1, comprising at least one twisted pair of electrical power conducting members extending alongside said core tube.

6. The composite cable of claim 1, further comprising a second strength jacket formed of a plurality of strength members, helically wrapped in the opposite direction from said first strength jacket.

7. The composite cable of claim 1, further comprising at least one waterblocking member within said outer jacket.

8. The composite cable of claim 1, wherein said outer jacket is flame retardant so that said composite cable can be used as a plenum cable.

9. A composite fiber optic distribution cable having a longitudinal axis, comprising:
    a longitudinally extending central core tube encasing at least one longitudinally extending optical fiber;
    at least one first electrical power conducting member extending alongside said core tube;
    a plurality of non-metallic strength members arrayed about said core tube so as to form a first strength jacket about said core tube, said strength members being made of fiberglass or poly (p-phenyleneterephthalamide); and
    an outerjacket encasing said plurality of strength members.

10. A composite fiber optic distribution cable having a longitudinal axis comprising:
    a longitudinally extending central core tube encasing at least one longitudinally extending optical fiber;
    at least one first electrical power conducting member extending alongside said core tube;
    a plurality of non-metallic strength members contiguously arrayed about said core tube so as to form a first strength jacket about said core tube, at least one of said strength members being in physical contact with said at least one power conducting member;
    wherein said strength members form a contiguous layer of individual strength members about said core tube; and
    an outer jacket encasing said plurality of strength members.

11. The composite cable as claimed in claim 10 and further comprising at lest a second electrical power conducting member extending alongside said core tube, on the opposite side of the cable longitudinal axis from said at least one first electrical power conducting member; and
    wherein said first and second electrical power conducting members are incorporated into said contiguous layer as elements thereof.

* * * * *